United States Patent [19]

Brem

[11] Patent Number: 4,629,917

[45] Date of Patent: Dec. 16, 1986

[54] CONNECTING DEVICE FOR THE STATOR WINDING RODS OF ELECTRICAL MACHINES

[75] Inventor: Ernst Brem, Schlieren, Switzerland

[73] Assignee: BBC Brown, Boveri & Company Limited, Baden, Switzerland

[21] Appl. No.: 769,062

[22] Filed: Aug. 26, 1985

[30] Foreign Application Priority Data

Sep. 7, 1984 [CH] Switzerland .............. 4272/84

[51] Int. Cl.⁴ .............................................. H02K 9/00
[52] U.S. Cl. ..................... 310/59; 310/60 A; 310/65; 310/71; 310/91; 310/180; 310/261
[58] Field of Search .............. 310/71, 54, 57, 58, 310/59, 60 R, 60 A, 64, 65, 213, 260, 254, 91, 208, 42, 179, 180, 184

[56] References Cited

U.S. PATENT DOCUMENTS

| 3,112,415 | 11/1963 | Bahn | 310/54 |
|---|---|---|---|
| 3,185,872 | 5/1965 | Weissheimer | 310/213 |
| 3,614,493 | 10/1971 | Collings | 310/58 |
| 3,955,110 | 5/1976 | Karlen | 310/54 |
| 4,308,476 | 12/1981 | Schuler | 310/213 |

FOREIGN PATENT DOCUMENTS

| 1961376 | 6/1970 | Fed. Rep. of Germany | 310/54 |
|---|---|---|---|
| 2803015 | 7/1978 | Fed. Rep. of Germany | |
| 0035543 | 2/1984 | Japan | 310/54 |
| 481517 | 12/1969 | Switzerland | |

OTHER PUBLICATIONS

"BBC-Nachrichten" 60, vol. 1/1978, pp. 1-11.

Primary Examiner—R. Skudy
Attorney, Agent, or Firm—Oblon, Fisher, Spivak, McClelland, & Maier

[57] ABSTRACT

The connecting device has yokes (5, 6) brazed to the winding rod ends (1, 2), and the end surfaces of the yokes have distance pieces (10, 11, 12, 13). The hollow conductors (4) protrude beyond the solid part conductors (3) and are led through brazing plates (14, 15) which are brazed to both the hollow conductors (4) and the distance pieces (10, 11, 12, 13). Caps (16, 17) are placed over the brazing plates (14, 15) and brazed to the brazing plates (14, 15) in such a way that there is no leakage of liquid. The brazing points can be inspected at any time and, if necessary, improved because of the distance between the brazing plates (14, 15) and the rod end surface. The water chambers (20, 21) formed by the brazing plates (14, 15) and the caps (16, 17) are solidly connected to the winding rods (1, 2) and to the yokes (5, 6), so that no relative vibrations, which can damage the hollow conductors, can occur. The water chambers (20, 21), which are expensive in manufacture, do not depend on the rod geometry. The whole of the variance is provided by the brazing plates (14, 15) which are relatively simple to manufacture.

12 Claims, 3 Drawing Figures

CONNECTING DEVICE FOR THE STATOR WINDING RODS OF ELECTRICAL MACHINES

FIELD OF THE INVENTION

The invention refers to a connection device for the supply or removal of the cooling fluid to or from the hollow conductors of the stator winding rods of electrical machines in which the hollow conductors and the solid conductors of the winding rods are held together by a metallic component.

BACKGROUND OF THE INVENTION

In the known connecting devices for the simultaneous electrical connection of two neighbouring stator winding rods and the supply or removal of the cooling fluid to or from the hollow conductors of the stator winding rods, it is generally possible to differentiate between two design forms.

In the first type, (which is known for example from the Journal "BBC-Nachrichten" 60, Volume 1/1978, p. 6, FIG. 5), two rod ends, one above the other, are connected electrically by a strap. The hollow conductors of one rod protrude from the strap into one water chamber and are there brazed. Both water chambers are screwed onto an intermediate part fastened to the strap. Although, because of the distance between the water chamber and the rod end, it is possible to inspect satisfactorily the brazed connection between the hollow conductors and the water chamber, the distance has the disadvantage that the water chamber is not directly connected to the rod end. Even additional support for the water chamber by means of synthetic resin impregnated glass cords cannot completely prevent relative movements between the end of the rod and the water chamber. The hollow conductors are, of course, somewhat deformed by this relative movement. If the relative movement occurs during a vibration, the water chamber also vibrates relative to the end of the rod and the deformation procedure is repeated. The repeated deformation of the hollow conductor during this vibration relative to the end of the rod can lead to hollow conductor fractures.

In the second type of connection devices (such as is known, for example, from the German Offenlegungsschrift No. 2 803 015), the cooling fluid supply and the electrical connection between two neighbouring rod ends are combined in one component. Both rod ends are directly brazed to the water chamber. Although, in this case, there is no load on the hollow conductors, the danger of blockage of the hollow conductors by the material used for brazing does exist. Furthermore, the brazing process is expensive. Visual inspection of the braze and improvements to it are practically excluded. Furthermore, a special water chamber has to be designed and manufactured for each rod geometry.

A compromise (which is, however, expensive) between the two types described is provided by the connecting device according to Swiss Pat. No. 481 517. In this connecting device for the supply of the cooling fluid to the hollow conductors of the stator winding rods of electrical machines, the hollow and the solid conductors of the winding rod are collected by an attachment which is connected, on the one hand, to a supply connection for the cooling fluid and, on the other hand, electrically, to hollow and solid conductors. The hollow conductors protrude from the attachment into the internal space of the water chamber and are fastened so as to be liquid-tight in an insert bush. The insert bush is fastened to the end face of the attachment where the hollow conductors emerge. A packet of flexible strips, which provide the electrical connection between neighbouring rods, is also welded to the attachment. The free access to the ends of the hollow conductors makes it possible to ensure that the ducts in each hollow conductor are free and to check their hydraulic resistance. The free access to the ends of the hollow conductors also facilitates any repair work necessary. The attachment forms a rigid connection between the conductor rod ends and the water chamber. However, because of its triple function, it is very expensive. In addition, it increases the total overhang of the winding head to a substantial extent, it must be specially adapted for each rod geometry, and it requires substantial manipulation when bending the hollow conductors into place.

OBJECT OF THE INVENTION

On basis of the state of the principal art described above in accordance with the Swiss Pat. No. 481 517, the objective of the invention is to produce a connecting device, of the general type described, which makes possible optimum support for the water chamber rod end with a small axial installation length and simple fabrication.

ADVANTAGES OF THE INVENTION

The subject of the invention combines the advantages of the connecting devices of "BBC-Nachrichten" described above, on the one hand, and those according to the German Offenlegungsschrift No. 2 803 015 and the Swiss Pat. No. 481 517, without exhibiting their disadvantages.

All the critical brazing points, particularly those in the brazing plate, can be inspected visually from both sides. Improvements to the brazed connections are possible even with the winding installed.

The water chamber is rigidly connected to the rod end so that no relative vibrations can occur.

The most expensive component from the point of view of fabrication (i.e., the water chamber) no longer depends on the rod geometry. The whole of the variance is in the adaptation of the brazing plate in terms of the hole pattern and sizes of the hollow conductors.

The hollow conductor ends require no subsequent deformation to fit them into the brazing plate.

The two critical brazed connections (hollow conductor/brazing plate, brazing plate/water chamber) can be produced, inspected, and (if necessary) reworked in sequence.

BRIEF DESCRIPTION OF THE DRAWINGS

The invention is described in more detail below using an example shown in the drawings.

In the drawings.

DETAILED DESCRIPTION OF THE PRESENTLY PREFERRED EMBODIMENTS

Figure 1:
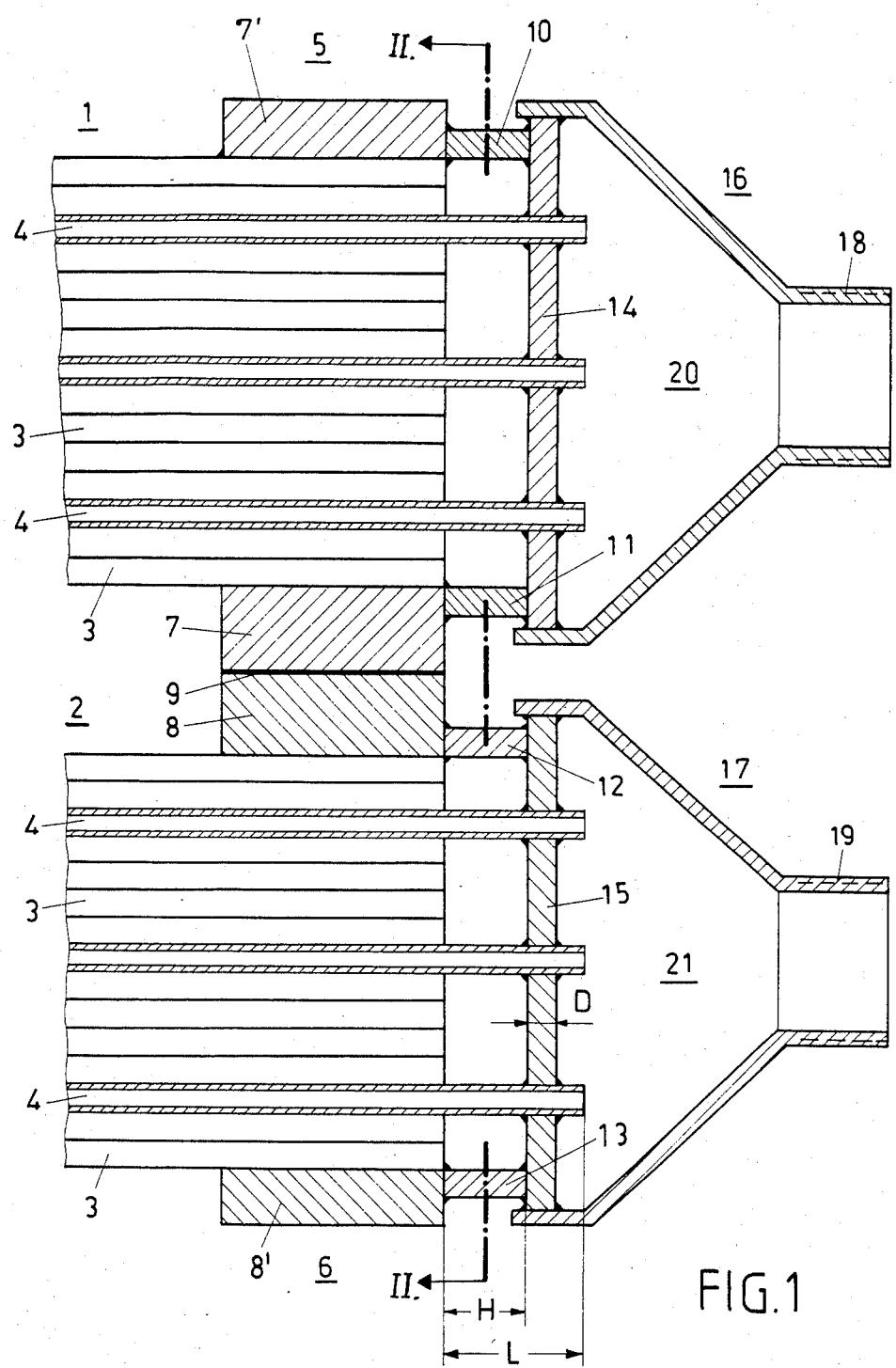
FIG. 1 shows a longitudinal section through the end part of two stator winding rods, one above the other, with the associated connecting device.
Figure 2:
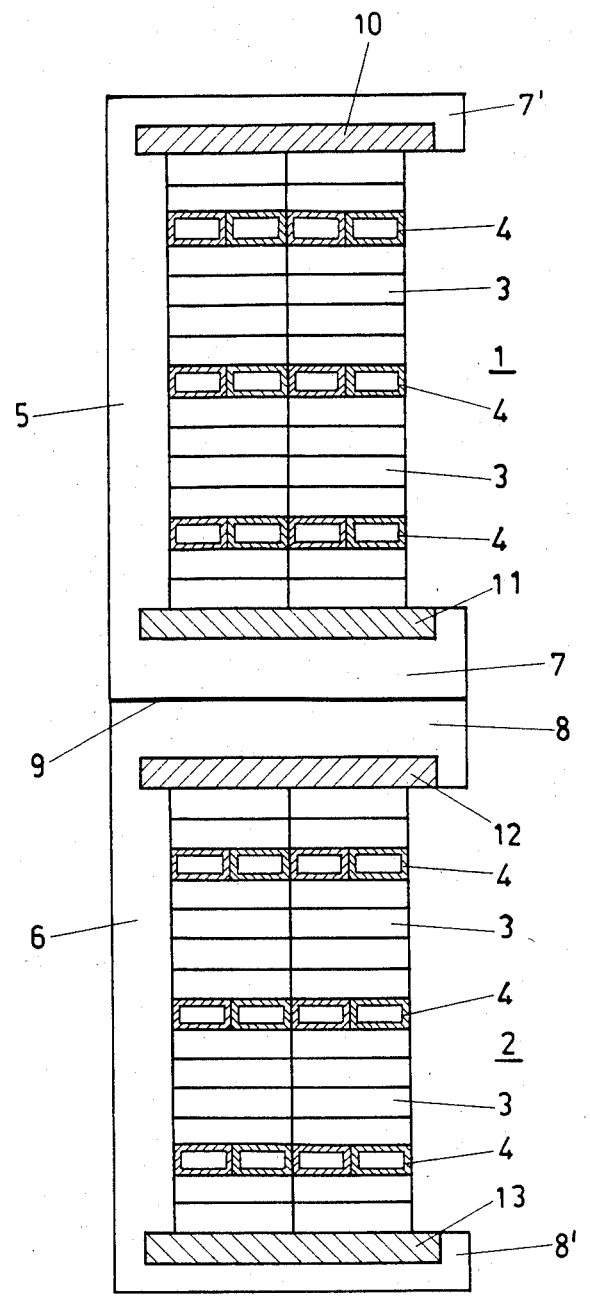
FIG. 2 shows a cross-section through the rod end of FIG. 1 along the line II—II in that diagram.
Figure 3:
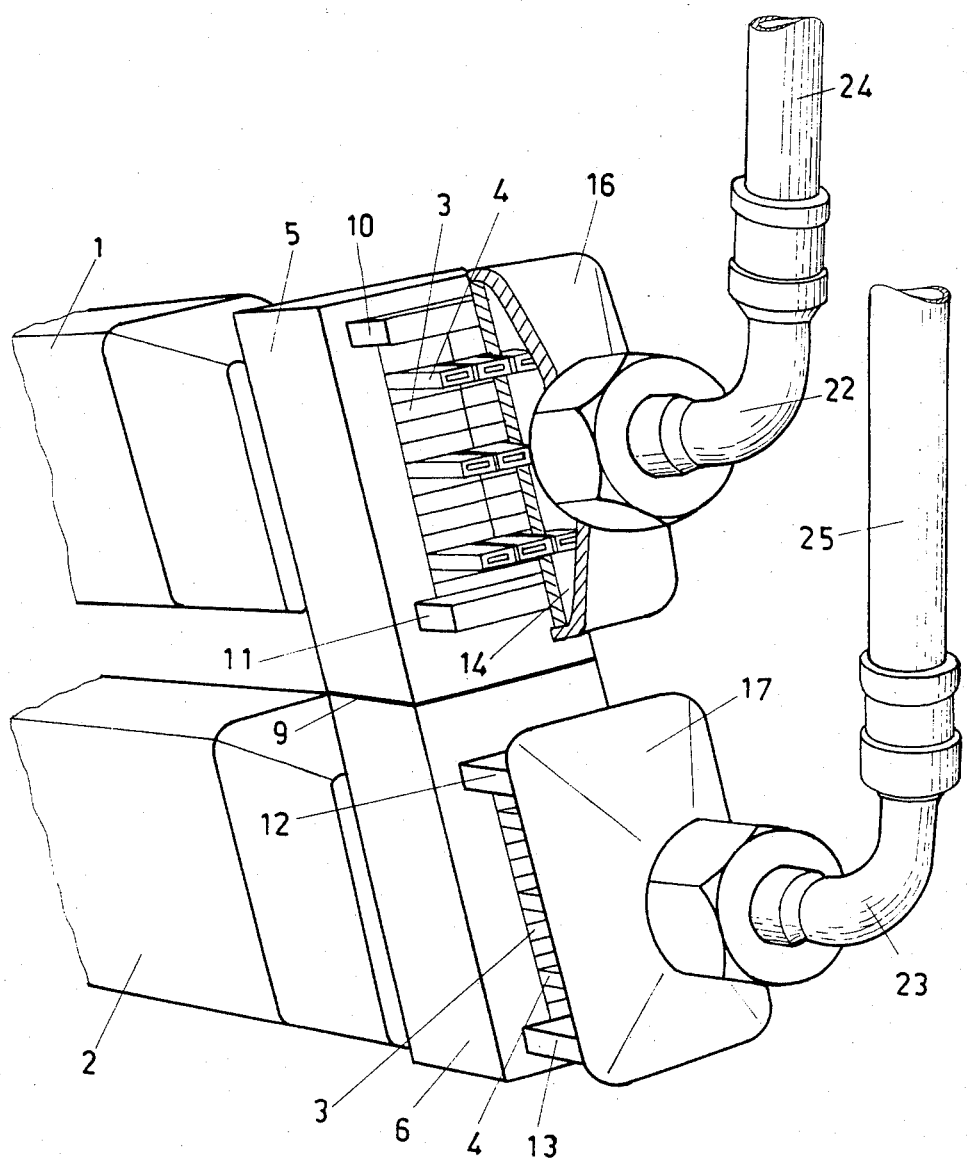
FIG. 3 shows a perspective representation of the connecting device with parts broken away to show the inside.

In FIGS. 1 to 3, stator winding rods generally indicated by 1 and 2 are composed of solid part conductors 3 and hollow conductors 4, whose distribution over the rod cross-section can be seen from FIG. 2. The hollow conductors 4 protrude beyond the solid part conductors 3 by the length L (shown in FIG. 1). The electrical and mechanical connection of the solid part conductors 3 and the hollow conductors 4 of the rods 1, 2 are provided by U-shaped yokes 5, 6, manufactured from copper, which are brazed to the rod ends flush with the end surfaces of the solid part conductors 3. The inward facing arms 7, 8 of the yokes 5, 6 are dimensioned in such a way that they are in contact with one another in the installed condition of the stator winding rods. They are then brazed together over a large surface by a braze joint 9. The inward facing arms 7, 8 provide the electrical circuit connection between the rods 1 and 2.

Fastened to the outward facing end surfaces of the arms 7, 7' and 8, 8' of the yokes 5, 6 are distance pieces (each having the shape of a right parallelepiped) 10, 11, 12, 13, which can also be designed to be integral with the yokes 5, 6. Each of the distance pieces 10, 11 and 12, 13 is followed by a brazing plate 14 and 15, respectively. The brazing plates 14, 15 have a number of penetrations corresponding to the number of hollow conductors 4. The cross-section and distribution over the brazing plate of the penetrations correspond to the cross-section and distribution of the hollow conductors 4 over the rod cross-section. The height H of the distance pieces 10, 11, 12, 13, the thickness D of the brazing plates 14, 15, and the overhang dimension L of the hollow conductor 4 are matched to each other in such a way that the hollow conductor 4 protrudes from the brazing plates 14, 15 by a few millimeters.

The brazing plates 14, 15 are brazed to both the distance pieces 10, 11, 12, 13 and the hollow conductors 4 for cooling liquid which penetrate through them. Each of the brazing plates 14, 15 is hooded by a truncated pyramid-shaped cap 16, 17 with connection stubs 18, 19. Each cap 16, 17 is brazed to the associated brazing plates 14, 15 so as to be liquid-tight. The brazing plates 14, 15, together with the caps 16, 17, form the actual water chambers 20 and 21, respectively. Connected to the water chambers 20, 21 are the hose fittings 22, 23 of an insulating hoses 24, 25 (FIG. 3). The insulation hoses 24, 25 insulate the water chambers 20, 21 against a header pipe at earth potential (on this point see "BBC-Nachrichten", as identified above, FIGS. 5 and 6).

The manufacture of the connecting device described takes place substantially in the following process steps:

(a) Construction of the winding rod outside the machine from the solid part conductors 3 and the hollow conductors 4 insulated relative to one another, the partial conductor insulation at the rod end being removed along a length corresponding to the axial extension of the yokes 5, 6.
(b) Brazing of the yokes 5, 6 to the rod ends, the joints between the part conductors 3 and the hollow conductors 4 being filled with brazing material.
(c) Attachment of the distance pieces 10, 11, 12, 13 to the end surfaces of the arms 7, 7', 8, 8' of the yokes 5, 6, if these are not already provided on the arms.
(d) Placing the brazing plates 14, 15 on the protruding ends of the hollow conductors 4 and brazing of the brazing plates 14, 15 to both the hollow conductors 4 and the distance pieces 10, 11, 12, 13.
(e) Inspection of the brazing points, particularly between the brazing plates 14, 15 and the hollow conductors 4.
(f) Placing the caps 16, 17 in position and brazing them to the brazing plates 14, 15.
(g) Inspection of the water chambers 20, 21 for leaks.
(h) Application of the main insulation, impregnation with resin, and baking out of the winding rods 1, 2.
(i) Installation and fixing of the winding rods 1, 2 in the bottom of the stator.
(j) Making the circuit connection by brazing the arms, 7 8 (facing one another) of the yokes 5, 6.
(k) Connection of the water chambers 20, 21 to the cooling system of the stator.

A series of modifications to the embodiment examples described are possible without departing from the scope of the invention.

The yokes 5, 6 could, for example, be designed in two parts as half-yokes of U-profile completely enclosing the rod ends or as a sleeve with a rectangular cross-section.

The two yokes 5 and 6 could be designed in one piece, for example with E or H section, or half-yokes with E section could be brazed to the rod ends on both sides of the rod ends. These variants do, however, require a differential sequence in the process steps listed above. Step b, and also steps c, d, e, f, g would follow on from step i in this sequence; step j would disappear.

To the extent possible for cooling-technical reasons, the invention can also be applied to produce a water chamber enclosing two rod ends. For this purpose, it is only necessary to combine the brazing plates 14, 15 into a common plate and appropriately to adapt the caps 16 and 17.

What is claimed is:

1. A connecting device for an electrical machine comprising a plurality of stator winding rods having rod ends in which hollow conductors and solid conductors are held together by a metallic yoke which, on the one hand, is connected to a chamber for cooling liquid and, on the other hand, is connected to the hollow conductors and the solid conductors, in which device the hollow conductors protrude from the metallic yoke and are led into the chamber and are fastened, in such a way that the liquid cannot leak, into a brazing plate which is fastened to the end of the metallic yoke where the hollow conductors emerge, characterised in that:
    (a) the metallic yoke at least partially encloses the rod ends and is brazed to the rod ends;
    (b) the hollow conductors are led on in a straight line;
    (c) at least one distance piece is disposed between the brazing plate and the metallic yoke and is fastened to both the brazing plate and to the metallic yoke; and
    (d) the chamber is directly connected to the brazing plate in such a way that the liquid cannot leak.

2. A connecting device according to claim 1, characterised in that:
    (a) a cap is directly connected to the brazing plate and
    (b) the brazing plate and the cap form the boundaries of the chamber.

3. A connecting device according to claim 1, characterised in that the ends of the hollow conductors penetrate into the chamber.

4. A connecting device according to claim 1, characterised in that:

(a) the metallic yoke has a U-shaped cross-section and
(b) the rod ends are brazed to the metallic yoke.

5. A connecting device according to claim 1, characterised in that:
  (a) the connecting device comprises a plurality of rod ends and a plurality of associated metallic yokes and
  (b) the metallic yokes are brazed together to provide an electrical connection between adjacent rod ends.

6. A connecting device according to claim 4, characterised in that:
  (a) the connecting device comprises a plurality of rod ends and a plurality of associated metallic yokes and
  (b) the metallic yokes enclose, at least partially, two adjacent rod ends.

7. An electrical machine comprising:
  (a) a first stator winding rod having a first end and a second end, said first stator winding rod comprising a plurality of solid conductors and a plurality of hollow conductors each of which has a first end and a second end, said plurality of solid conductor and said plurality of hollow conductors:
    (i) being parallel to each other;
    (ii) extending in an axial direction; and
    (iii) being in thermal and electrical contact with each other,
  the first ends of said plurality of hollow conductors projecting axially beyond the first ends of said plurality of solid conductors;
  (b) a first electrically conductive yoke having a first end and a second end, said first electrically conductive yoke partly surrounding the first end of said first stator winding rod and being in thermal and electrical contact therewith, the first end of said first electrically conductive yoke being at least approximately coplanar with the first ends of said plurality of solid conductors comprising said first stator winding rod;
  (c) at least one first distance piece having a first end and a second end, the second end of said at least one first distance piece being connected to the first end of said first electrically conductive yoke and said at least one first distance piece projecting from said first electrically conductive yoke in the axial direction of said first stator winding rod;
  (d) a first plate disposed perpendicularly to said first stator winding rod, said first plate:
    (i) being fixedly connected to the first end of said at least one first distance piece and
    (ii) having a plurality of first holes therethrough sized, shaped, and positioned to make liquid-tight engagement with said plurality of hollow conductors comprising said first stator winding rod; and
  (e) a first cap connected to said first plate in a liquid-tight manner and extending therefrom in the direction away from said first stator winding rod, said first cap and said first plate defining a first chamber for liquid, said first cap having a first connection stub for connecting said first chamber to a first liquid fluid conduit.

8. An electrical machine as recited in claim 7 wherein each one of said plurality of hollow conductors comprising said first stator winding rod extends through a corresponding one of said plurality of first holes through said first plate.

9. An electrical machine as recited in claim 7 wherein said first electrically conductive yoke is U-shaped.

10. An electrical machine as recited in claim 7 and further comprising:
  (a) a second stator winding rod having a first end and a second end, said second stator winding rod comprising a plurality of solid conductors and a plurality of hollow conductors each of which has a first end and a second end, said plurality of solid conductor and said plurality of hollow conductors:
    (i) being parallel to each other;
    (ii) extending in an axial direction; and
    (iii) being in thermal and electrical contact with each other,
  the first ends of said plurality of hollow conductors projecting axially beyond the first ends of said plurality of solid conductors and the axial direction in which said second stator winding rod extends being parallel to the axial direction in which said first stator winding rod extends;
  (b) a second electrically conductive yoke having a first end and a second end, said second electrically conductive yoke partly surrounding the first end of said second stator winding rod and being in thermal and electrical contact therewith, the first end of said second electrically conductive yoke being at least approximately coplanar with the first ends of said plurality of solid conductors comprising said second stator winding rod;
  (c) said first and second electrically conductive yokes being in fixed contact with each other over a large surface area to provide electrical circuit connection between said first stator winding rod and said second stator winding rod;
  (d) at least one second distance piece having a first end a second end, the second end of said at least one second distance piece being connected to the first end of said second electrically conductive yoke and said at least one second distance piece projecting from said second electrically conductive yoke in the axial direction of said second stator winding rod;
  (e) a second plate disposed perpendicularly to said second stator winding rod, said second plate:
    (i) being fixedly connected to the first end of said at least one second distance piece and
    (ii) having a plurality of second holes therethrough sized, shaped, and positioned to make liquid-tight fluid engagement with said plurality of hollow conductors comprising said second stator winding rod; and
  (f) a second cap connected to said second plate in a liquid-tight manner and extending therefrom in the direction away from said second stator winding rod, said second cap and said second plate defining a second chamber for liquid, said second cap having a second connection stub for connecting said second chamber to a second liquid conduit.

11. An electrical machine as recited in claim 10 wherein each one of said plurality of hollow conductors comprising said second stator winding rod extends through a corresponding one of said plurality of second holes through said second plate.

12. An electrical machine as recited in claim 10 wherein said second electrically conductive yoke is U-shaped.

* * * * *